(12) United States Patent
Eguchi et al.

(10) Patent No.: US 7,559,700 B2
(45) Date of Patent: Jul. 14, 2009

(54) SHADING MEMBER-EQUIPPED OPTICAL CONNECTOR PLUG

(75) Inventors: Toshiaki Eguchi, Tokyo (JP); Naohide Goto, Tokyo (JP); Yasuaki Ohkubo, Tokyo (JP)

(73) Assignee: Honda Tsushin Kogyo Co., Ltd., Tokyo (JP)

( * ) Notice: Subject to any disclaimer, the term of this patent is extended or adjusted under 35 U.S.C. 154(b) by 0 days.

(21) Appl. No.: 12/000,838

(22) Filed: Dec. 18, 2007

(65) Prior Publication Data

US 2008/0247709 A1    Oct. 9, 2008

(30) Foreign Application Priority Data

Dec. 20, 2006   (JP)   ............................ 2006-342649

(51) Int. Cl.
  *G02B 6/26*   (2006.01)
  *G02B 6/42*   (2006.01)
  *G02B 6/36*   (2006.01)
  *G02B 6/38*   (2006.01)

(52) U.S. Cl. .............................. 385/70; 385/15; 385/39; 385/53; 385/55; 385/56; 385/57; 385/58; 385/59; 385/60; 385/72; 385/76; 385/77; 385/78; 385/92

(58) Field of Classification Search .................. 385/70, 385/72, 76–78, 92, 15, 39, 53, 55–60
See application file for complete search history.

(56) References Cited

U.S. PATENT DOCUMENTS

| 5,280,552 | A  | * | 1/1994  | Yokoi et al. ................... 385/78 |
| 2002/0191919 | A1 | * | 12/2002 | Nolan ........................ 385/78 |
| 2004/0062486 | A1 | * | 4/2004  | Tanaka et al. ................. 385/55 |

FOREIGN PATENT DOCUMENTS

| JP | 07-333454  | 12/1995 |
| JP | 2005-092082 | 4/2005  |

* cited by examiner

*Primary Examiner*—Frank G Font
*Assistant Examiner*—Jerry Blevins
(74) *Attorney, Agent, or Firm*—Wenderoth, Lind & Ponack, L.L.P.

(57) ABSTRACT

A shading member-equipped optical connector plug is compact while having the compatibility to engage existing connector receptacles. The connector plug includes a shading member having a shutter housing enclosing a plug frame slidably on an outside thereof. The shutter housing is inserted into an engagement opening of a connector receptacle to be engaged when the shading member-equipped optical connector is connected. The shading member also has a shutter one end of which is supported by the shutter housing at a front part of the housing and another end of which is urged by an elastic force and closes so as to shade the optical fibers at a position in front of the ferrule, and an elastic member disposed between the plug frame and the shutter housing that urges the shutter housing forward.

2 Claims, 14 Drawing Sheets

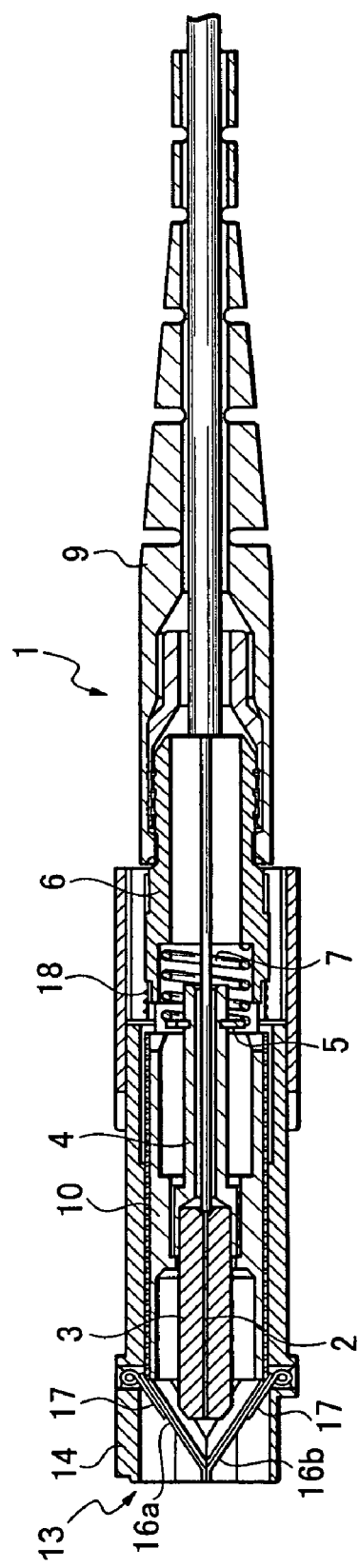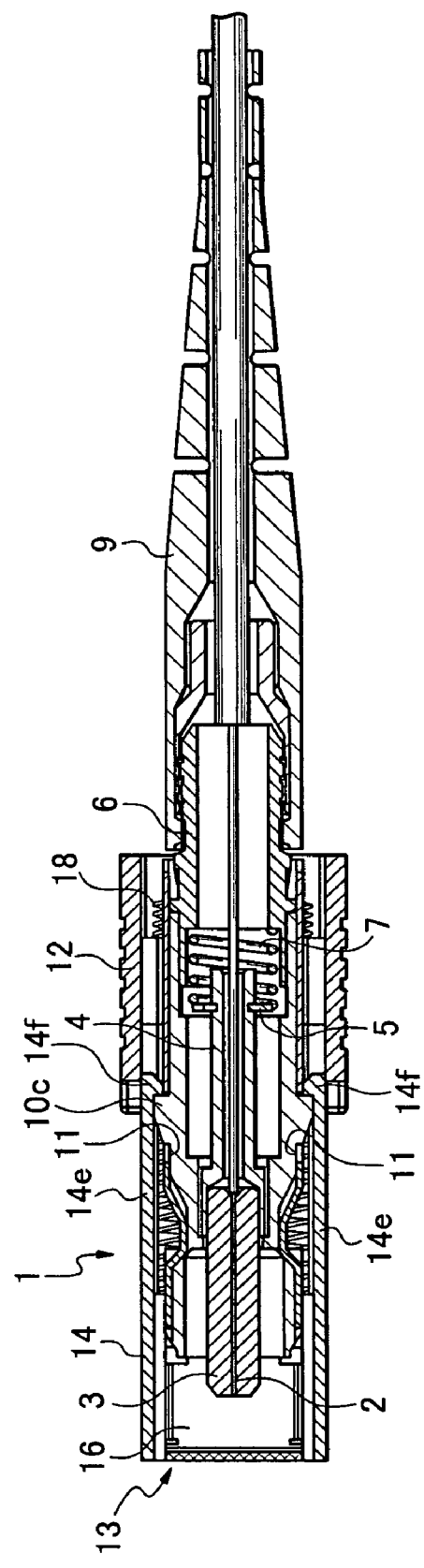

SHADING MEMBER-EQUIPPED OPTICAL CONNECTOR PLUG

BACKGROUND OF THE INVENTION

1. Field of the Invention

The present invention relates to an optical connector plug that detachably connects with a connector receptacle or adapter in a connector for an optical cable, and more particularly, to a shading member-equipped optical connector plug provided with means to block light from an optical fiber cable.

2. Related Art

Conventionally, in optical communications, since the power of the light source increases as the optical communication volume increases, looking directly into an optical signal while connecting an optical connector can damage the eye. Further, in recent years, with the introduction of optical communications-based Internet in companies and homes, the opportunities for ordinary people other than specialists to come into contact with optical connector plugs has increased, and with it the danger of looking directly into an optical signal and suffering consequent eye damage. Moreover, it is also necessary to protect the end of an optical cable from contamination by dirt and the like. Consequently, a shutter has come to be provided on optical connector plugs as eye protection means as well as dust protection means.

For example, in an optical connector described in JP-A-07-333454, a movable member is provided on an outer periphery of a connecting front surface side of an optical connector to which an optical cable is connected, and a cap member composed of a plurality of cap pieces is connected to a front surface side of the movable member by an opening/closing shaft. This opening/closing shaft is urged in a direction in which the cap pieces close, which enables the cap pieces to move in a direction of a diameter in conjunction with a sliding of the movable member with respect to the optical connector so as to open and close.

In addition, an optical fiber connector described in JP-A-2005-092082 comprises a plug shutter unit, which in turn comprises a movable cylinder, a shutter door, and an engagement piece. The shutter door is opened and closed in accordance with the movement of the movable cylinder. The engagement piece engages an engagement hook on a connector receptacle side and the movable cylinder is moved together with the connector receptacle. Then, when the optical finer plug is drawn out from the connector receptacle, the movable cylinder is moved by itself and the shutter door is closed.

However, in the invention described in JP-H07-333454-A, after the plug is engaged with the connector receptacle, even when such plug is removed the movable member does not automatically return to its original position, and therefore there is a risk that a worker might look directly into the light Moreover, in the invention described in JP-A-2005-092082, although there is an automatic return means for the shutter, a specialized engagement piece is used for that return means, and accordingly it cannot be used as is with conventionally existing optical connector plugs. Further, although a method that uses a biasing means as the return means for the movable member is shown, that biasing means appears on the outside of the plug, which vitiates its operability and increases the likelihood of a malfunction due to the sandwiching of foreign matter therewithin. Indeed, any structure that covers the body of the plug with a housing intended as a shutter increase the overall size of the plug, which makes it unsuitable for high-density mounting and in which the plug engagement piece is completely covered by the housing, which makes it difficult to guide and complicates fitting when inserting the plug into another connector receptacle.

SUMMARY OF THE INVENTION

The present invention has as its object to solve the above-described problems of the background art and provide a compact, highly compatible shading member-equipped optical connector plug that makes the optical connector plug compact while having the compatibility to engage existing connector receptacles.

Accordingly, a shading member-equipped optical connector plug according to the present invention comprises an optical connector plug including a synthetic resin plug frame that containably supports a cylindrical stick-shaped ferrule that holds a front end of an optical fiber and a cylindrical ferrule holder assembly that supports said ferrule; a cylindrical synthetic resin stop ring attached to a rear end of said plug frame and to which a front end of a synthetic resin hood that protects an optical cable covering the optical fiber is fitted; a spring that urges the ferrule forward; a planar metal slider engagingly attached to a side wall of the plug frame; and a synthetic resin knob engagingly supported by a pair of engagement projections formed on the slider, and a shading member that blocks light from the optical fiber on a connection side of the optical connector plug, wherein the shading member comprising: a shutter housing enclosing the plug frame slidably on an outside thereof, and inserted into an engagement opening of a connector receptacle to be engaged when the optical connector is connected; a shutter one end of which is supported by said shutter housing at a front part of the housing and another end of which is urged by an elastic force and closes so as to shade the optical fiber at a position in front of the ferrule; and an elastic member disposed between the plug frame and the shutter housing that urges the shutter housing forward.

In addition, preferably, a pair of flexible engagement pieces is provided on a rear end of the shutter housing, engagement projections that engage said flexible engagement pieces are provided on an outer periphery of said plug frame, and said knob encloses the rear end of said shutter housing and has notches formed in an outer periphery thereof that releases engagement of said flexible engagement pieces outside so as to make the shading member attachable to and detachable from the plug frame.

Further, preferably, the shutter comprises a pair of opposed shutter pieces disposed within said shutter housing so as to be rotatable about a support shaft, the shutter disposed so as to be urged by said elastic member and close at a position in front of said ferrule, a closing part where front ends of the shutter pieces contact each other disposed so as to project outside front side opening edges of the shutter housing.

According to the shaded member-equipped optical connector plug of the present invention, since the shutter housing encloses the plug frame slidably on an outside thereof, and inserted into an engagement opening of a connector receptacle to be engaged when the optical connector is connected, attachment can be smooth. Moreover, compatibility is high because even with the addition of the shading member to the plug side, there is no need to make special changes to the configuration on the connected connector receptacle side, and therefore connection can be carried out as conventionally. Further, the shading member does not project outside the external dimensions of the knob of the optical connector plug, and thus poses no obstacle to high-density installation.

The shading member can be attached to and detached from the optical connector plug and is functionally independent, and thus even when removed from the optical connector plug, poses no problem for the connection function of the plug. Therefore, a shading member removed from one optical connector plug can be used for another optical connector plug.

The closing parts of the shutter projects from the front side opening edge of the shutter housing, and thus the shutter housing experiences no relative movement when an object strikes the front surface side of the plug connector because it strikes the shutter pieces first. Therefore, there is no looking directly into the light, and further, there is no scratching of the plug connection end surfaces.

Other features and advantages of the present invention will be apparent from the following description when taken in conjunction with the accompanying drawings, in which like reference characters designate the same or similar parts throughout the several views thereof.

BRIEF DESCRIPTION OF THE DRAWINGS

FIG. 3A is a sectional view along a line 3A-3A shown in FIG. 2A;

FIG. 3B is a sectional view along a line 3B-3B shown in FIG. 2B;

DETAILED DESCRIPTION OF THE PREFERRED EMBODIMENTS

Figure 1A:
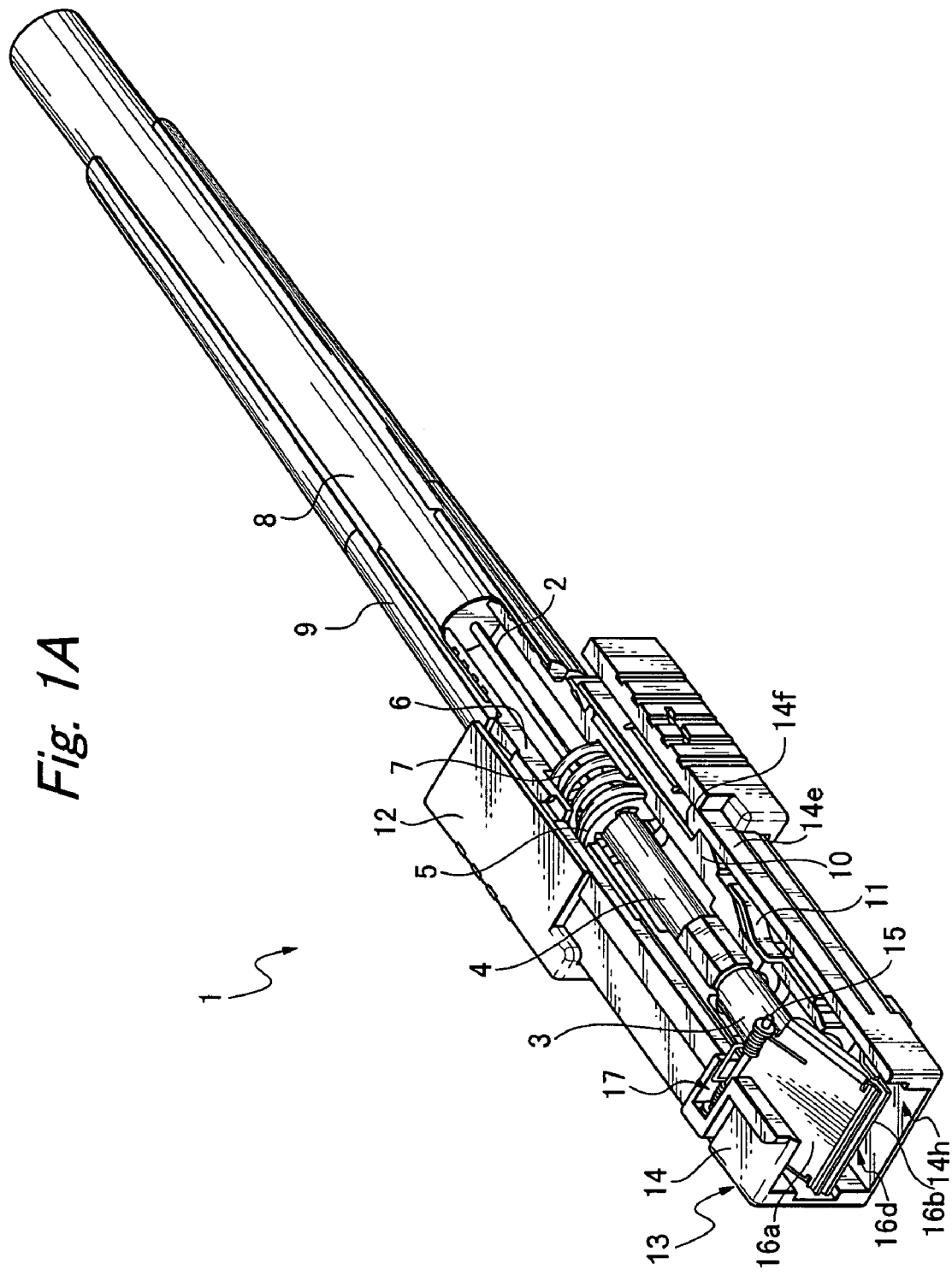
FIG. 1A is a perspective view from a front side of a partial cross-section of a shading member-equipped optical connector plug according to an embodiment of the present invention.

A detailed description will now be given of an exemplary embodiment of the present invention, with reference to the accompanying drawings. In so doing, although specific terminology is employed for the sake of clarity, the present disclosure is not to be limited to the specific terminology so selected. Therefore, it is to be understood that each specific element includes all technical equivalents thereof that operate in a similar manner and achieve a similar result.

As shown in FIGS. 1A through 3B, a shading member-equipped optical connector plug 1 according to the present invention is provided with a shading member 13 on a connection side of the optical connector plug, which blocks light from an optical fiber 2. That is, the shading member-equipped optical connector plug 1 is comprised of an optical connector plug including a synthetic resin plug frame 10 that containably supports an assembly of a cylindrical stick-shaped ferrule 3 that holds a front end of the optical fiber 2 and a cylindrical ferrule holder 4 having a front side hole into which the ferrule 3 is pressed so that the cylindrical ferrule holder 4 supports the ferrule 3, a cylindrical synthetic resin stop ring 6 attached to a rear end of the plug frame 10 and to which a front end of a synthetic resin hood 9 that protects an optical cable 8 covering the optical fiber 2 is fitted, a spring 7 that urges the ferrule forward, a planar metal slider 11 engagingly attached to a side wall of the plug frame 10, and a synthetic resin knob 12 engagingly supported by a pair of engagement projections 11a, 11b formed on the slider 11; and the shading member 13.

The spring 7 contacts an E-shaped ring 5 engaged in circumferential grooves provided on a rear outer peripheral surface of the ferrule holder 4 and uses a step formed in the stop ring 6 as a spring seat, and thus urges the ferrule 3 forward.

Figure 4:
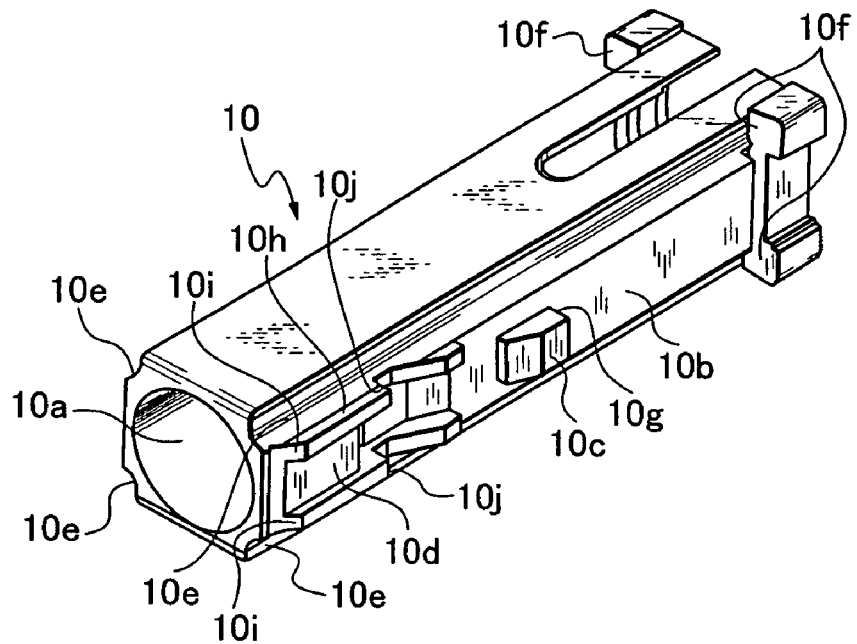
FIG. 4 is a perspective view of a plug frame of the shaded member-equipped optical connector plug.

The plug frame 10, as shown in FIG. 4, is a cylinder having its outside formed into substantially a square and its inside formed into a cylinder. The inside wall surface of the plug frame 10 slidably supports the ferrule holder 4, with the front of the ferrule 3 projecting from a front surface side opening 10a. Engagement portions 10c for the slider 11 are formed in lateral wall surfaces 10b of the plug frame 10, in front of which grooves 10d are formed to guide and contain the front of the slider 11.

Figure 12A:
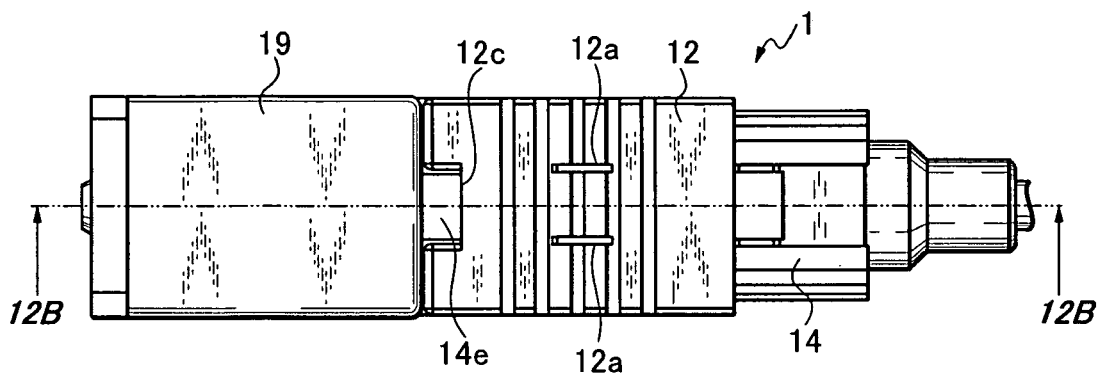
FIGS. 12A and 12B are a side view and a vertical sectional view along a line 12B-12B in FIG. 12A, respectively, of the shaded member-equipped optical connector plug and connector receptacle engaged.
Figure 12B:
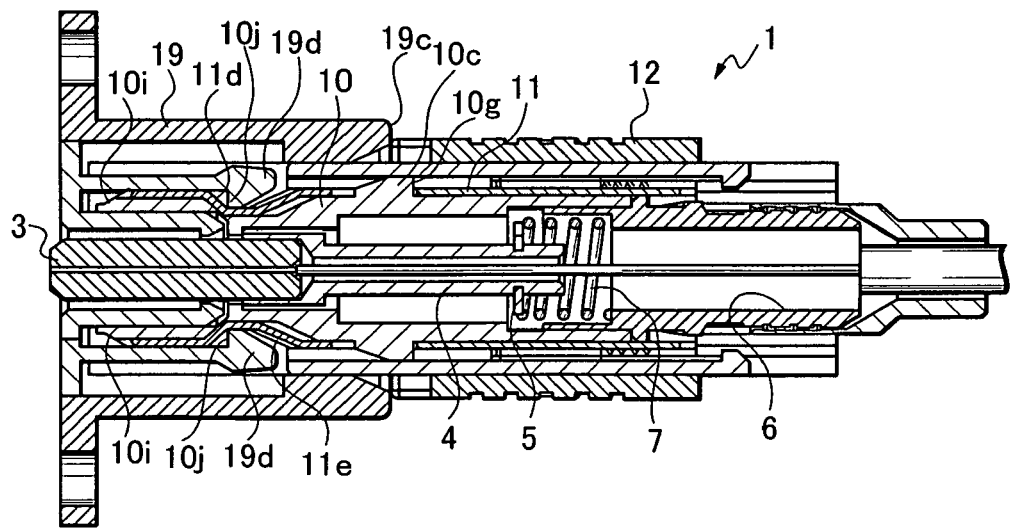
Figure 13A:
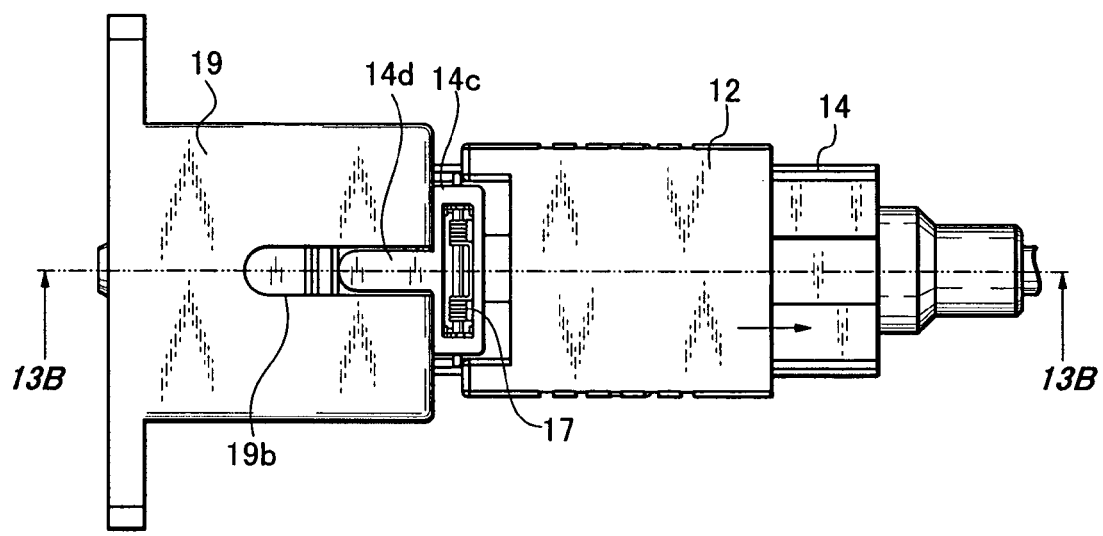
FIGS. 13A and 13B are a top view and a vertical sectional view along a line 13B-13B in FIG. 13A, respectively, showing motions of the respective parts when the shaded member-equipped optical connector plug and connector receptacle are just detached.
Figure 13B:
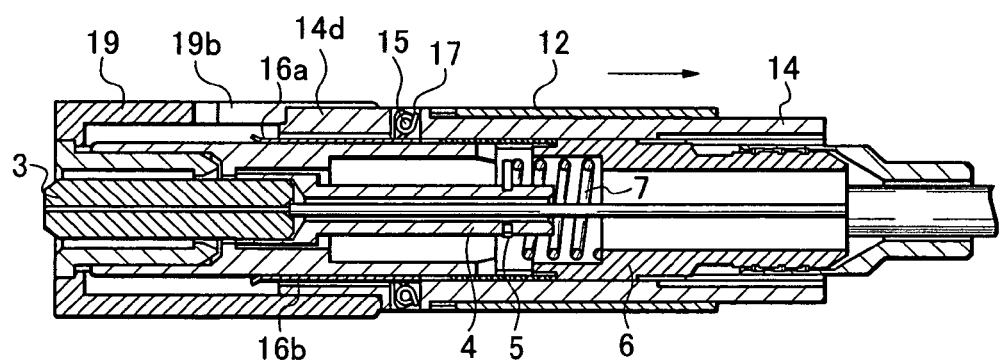

This groove 10d is formed by providing a pair of walls 10h, 10h oppositely disposed in a long direction. Each wall 10h has a tapered portion 10i to widen a flexible engagement hook 19d of another engaged connector receptacle 19 (see FIGS. 12A and 12B) on connecting with the plug frame 10, and a vertical portion 10j falling vertically from the rear end of a flat surface communicated with the tapered portion 10i. In a space between the pair of walls 10h, 10h, a release jig 11d of the slider 11 (to be described later) is received, which is not engaged while connected but releases engagement of the flexible engagement hook 19d by moving backward on detaching the engaged connector receptacle 19.

Further, concave portions 10e that in cross-section form an arc corresponding to roughly one-quarter of a circle are formed in the four corners of the square-shaped plug frame 10 so as to extend all the way to the rear of the plug frame 10 in a long direction thereof. Each of these concave portions 10e contains a spring 18 to be described later. The springs 18 are supported by spring seats 10f at the back, so as to generate a forward-biasing force.

Figure 5:
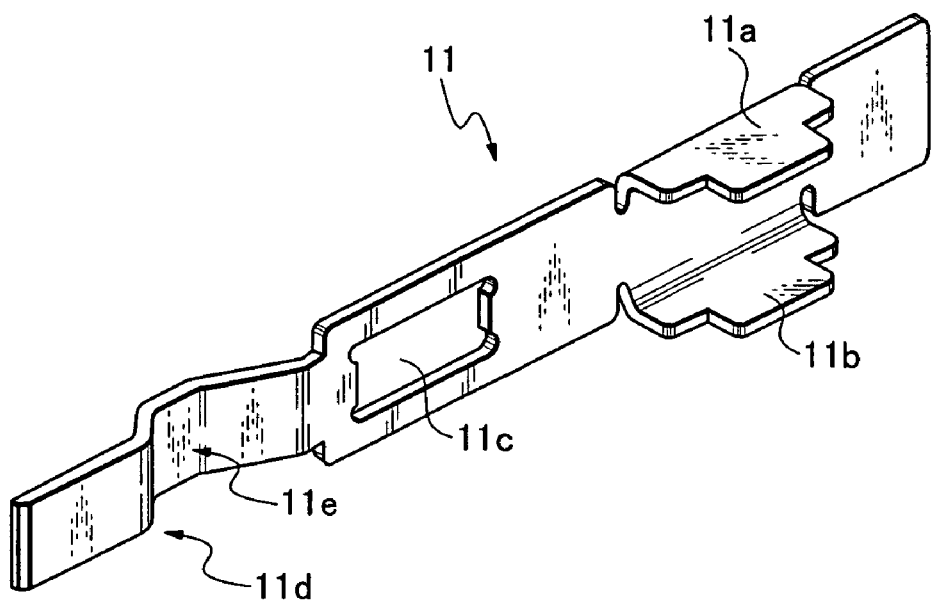
FIG. 5 is a perspective view of a slider of the shaded member-equipped optical connector plug.
Figure 6A:
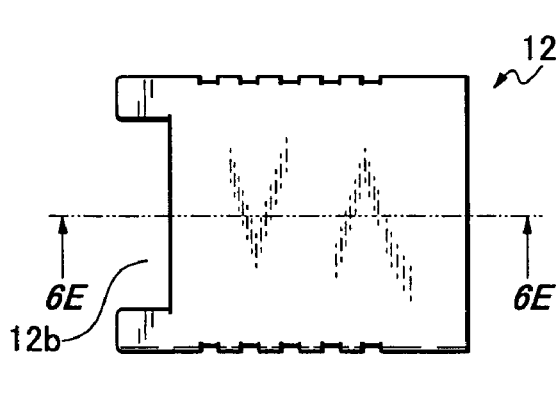
FIGS. 6A, 6B, 6C, and 6D, are respectively top, front, rear, and side views.
Figure 6B:
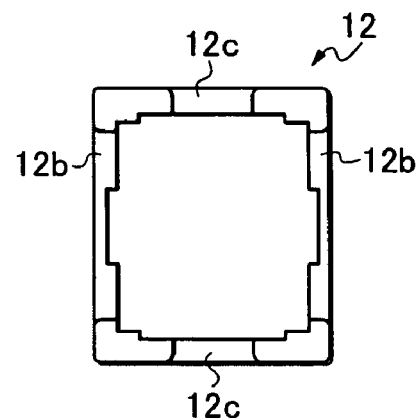
Figure 6C:
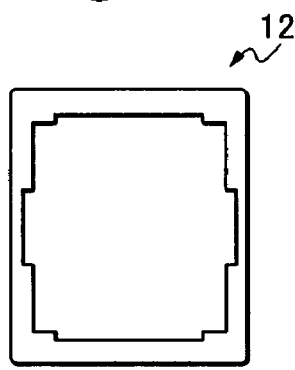
Figure 6D:
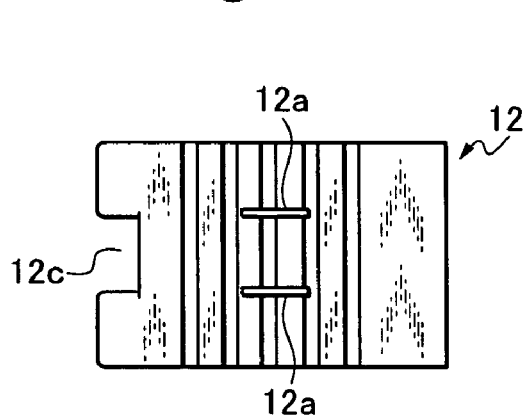
Figure 6E:
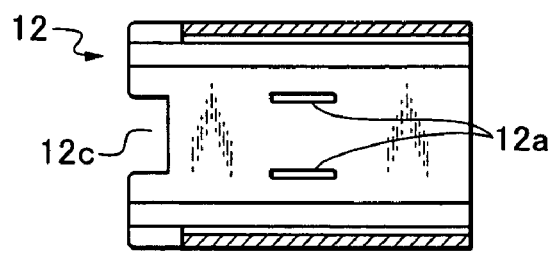
FIG. 6E is a sectional view along a line 6E-6E shown in FIG. 6A, of a knob of the shaded member-equipped optical connector plug.

The slider 11, as shown in FIG. 5, is a planar body of predetermined width, which engages the engagement projections 10c of the plug frame 10 and in which is formed at substantially a center portion thereof an engagement hole 11c that allows the slider 11 to slide back and forth within a predetermined range. The release jig 11d is formed on the front of the slider 11 and has a tapered portion for releasing engagement of the flexible engagement hook 19d of the engaged connector receptacle 19 by moving the knob 12 backward. A recess 11e is formed adjoining the rear end of the releasing jig 11d for receiving the flexible engagement hook 19d. It should be noted that the pair of engagement projections 11a, 11b engage engagement holes 12a in the knob 12 shown in FIGS. 6A-6E (to be described later). According to the slider 11, the flexible engagement hook 19d configured to be widened separately on connecting and detaching with and from the pair of walls 10h, 10h and the releasing jig 11d, and thus incomplete connection of the shading member-equipped optical connector plug 1 with the connector receptacle 19 may not be caused.

The knob 12, as shown in FIGS. 6A-6E, is a substantially rectangular cylindrical body that encloses the rear of the plug frame 10, the front of the stop ring 6, and a rear of a cylinder-like shutter housing 14 (see FIG. 8A-8G) to be described later. A reversed-"C"-shaped concave portion 12b is formed in a front end of the knob 12, in which fits a projection 14c that forms an opening 14a in the shutter housing 14. Further, notches 12c, 12c are formed in a front end side surface, use of which enable engagement by flexible engagement pieces 14e, 14e of the shutter housing 14 to be released from the outside.

Figure 7:
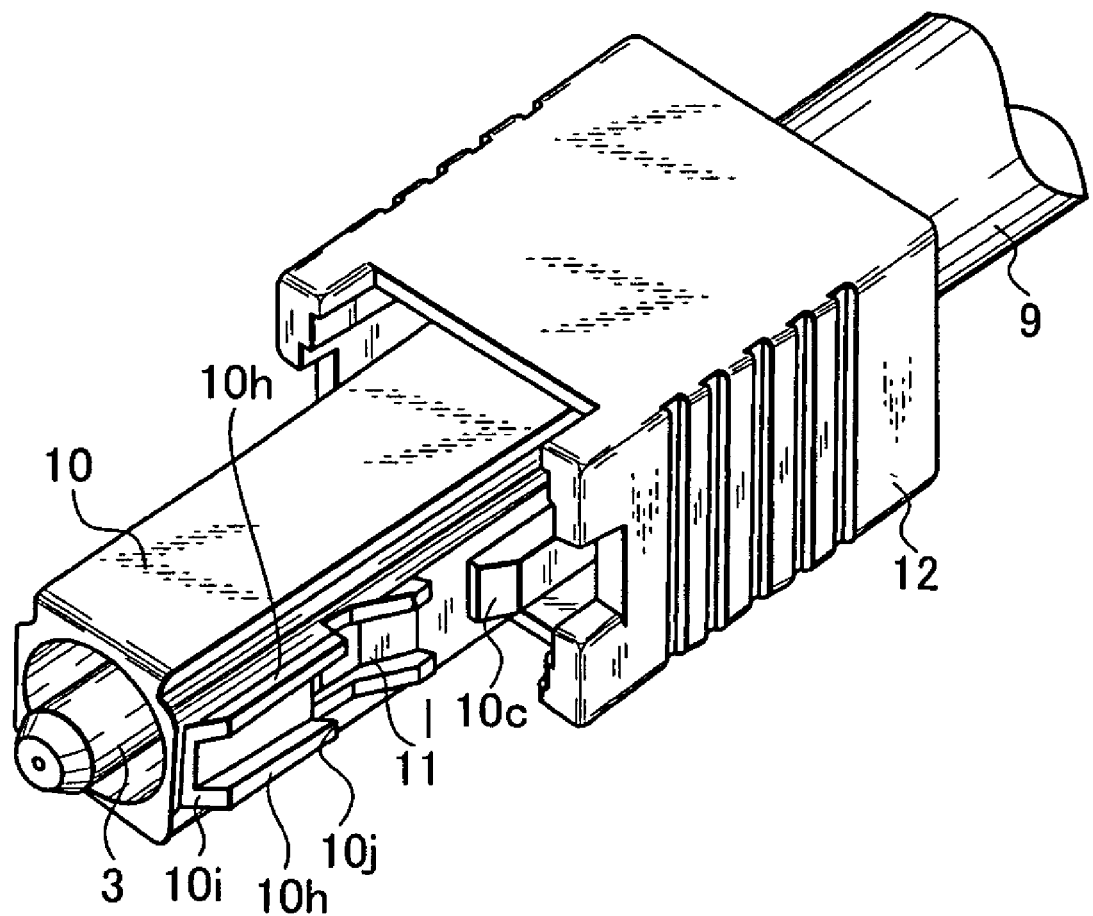
FIG. 7 is a perspective view of the shaded member-equipped optical connector plug with the shading member removed.
Figure 8A:
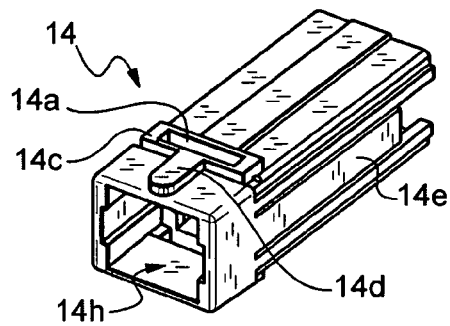
FIGS. 8A, 8B, 8C, 8D, and 8E are respectively perspective, top, front, rear, and side views.
Figure 8B:
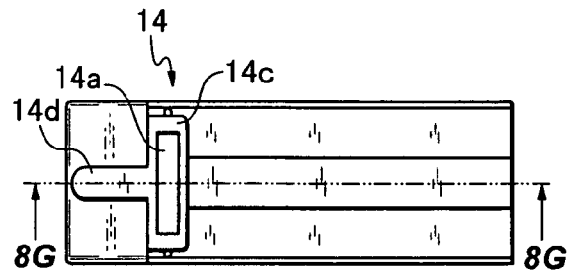
Figure 8C:
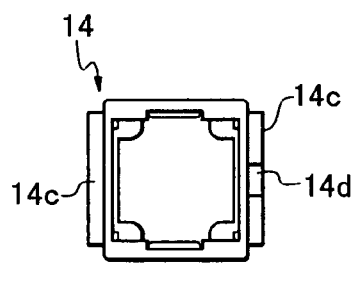
Figure 8D:
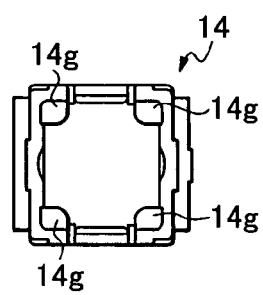
Figure 8E:
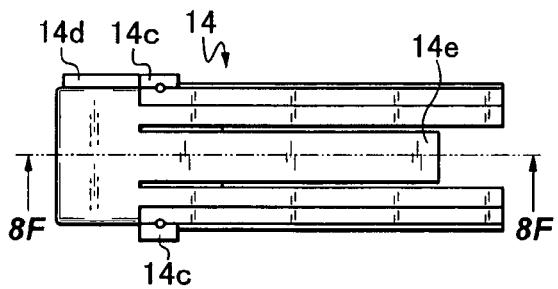
Figure 8F:
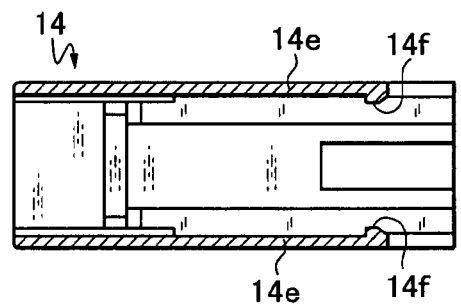
FIG. 8F is a sectional view along a line 8F-8F shown in FIG. 8E.
Figure 8G:
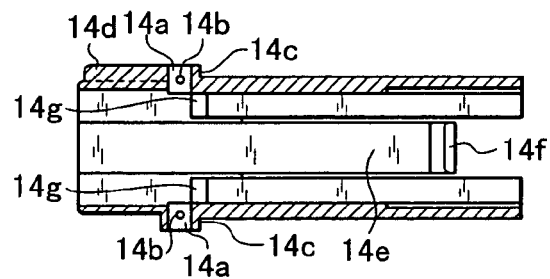
FIG. 8G is a sectional view along a line 8G-8G shown in FIG. 8B, of a shutter housing of the shaded member-equipped optical connector plug.
Figure 9A:
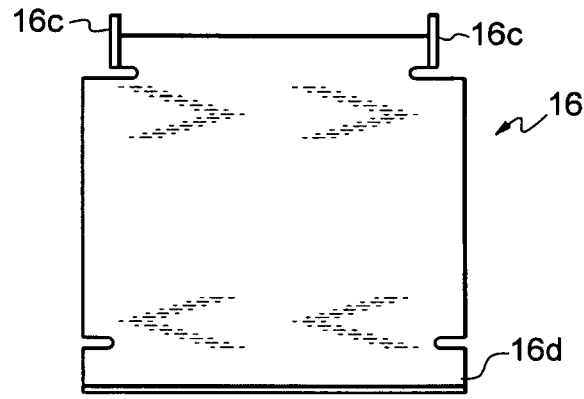
FIGS. 9A, 9B, 9C, and 9D are top, front, side and rear views, respectively, of a shutter of the shaded member-equipped optical connector plug.
Figure 9B:
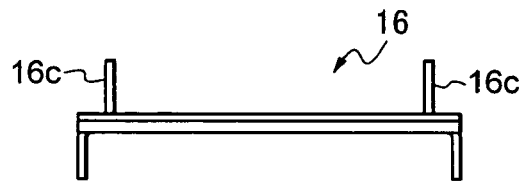
Figure 9C:
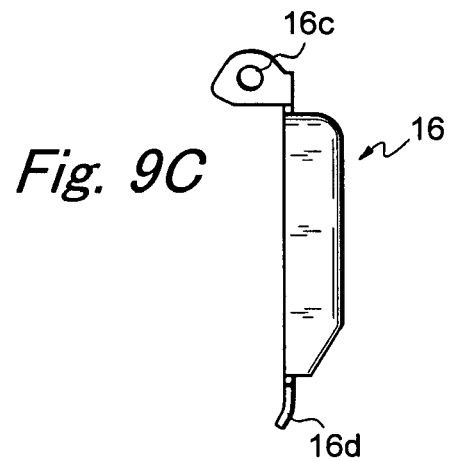
Figure 9D:
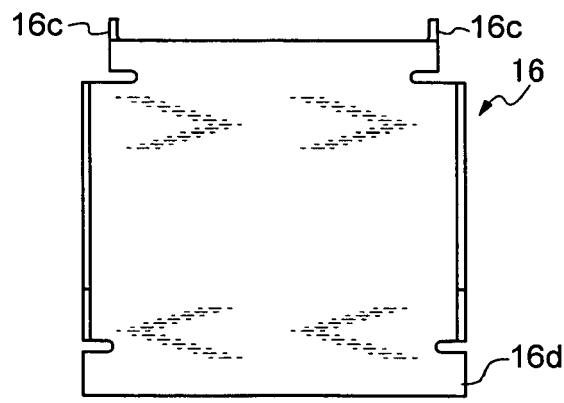

A shading member 13 is further attached to the front end of the optical connector plug shown in FIG. 7. The shading member 13 is comprised of a synthetic resin shutter housing 14, a shutter 16 (see FIGS. 9A-9D) a base of which is rotatably mounted on a support shaft 15 itself mounted between shaft holes 14b formed in wall surfaces in the long direction of the opening 14a provided in top and bottom wall surfaces of the shutter housing 14, a shutter spring 17 (see FIGS. 10A and 10B) that is an elastic member that continuously urges the shutter 16 so as to close, and the springs 18 (see FIGS. 3A, 3B) that are elastic members that constantly urge the shutter housing 14 forward.

Figure 1B:
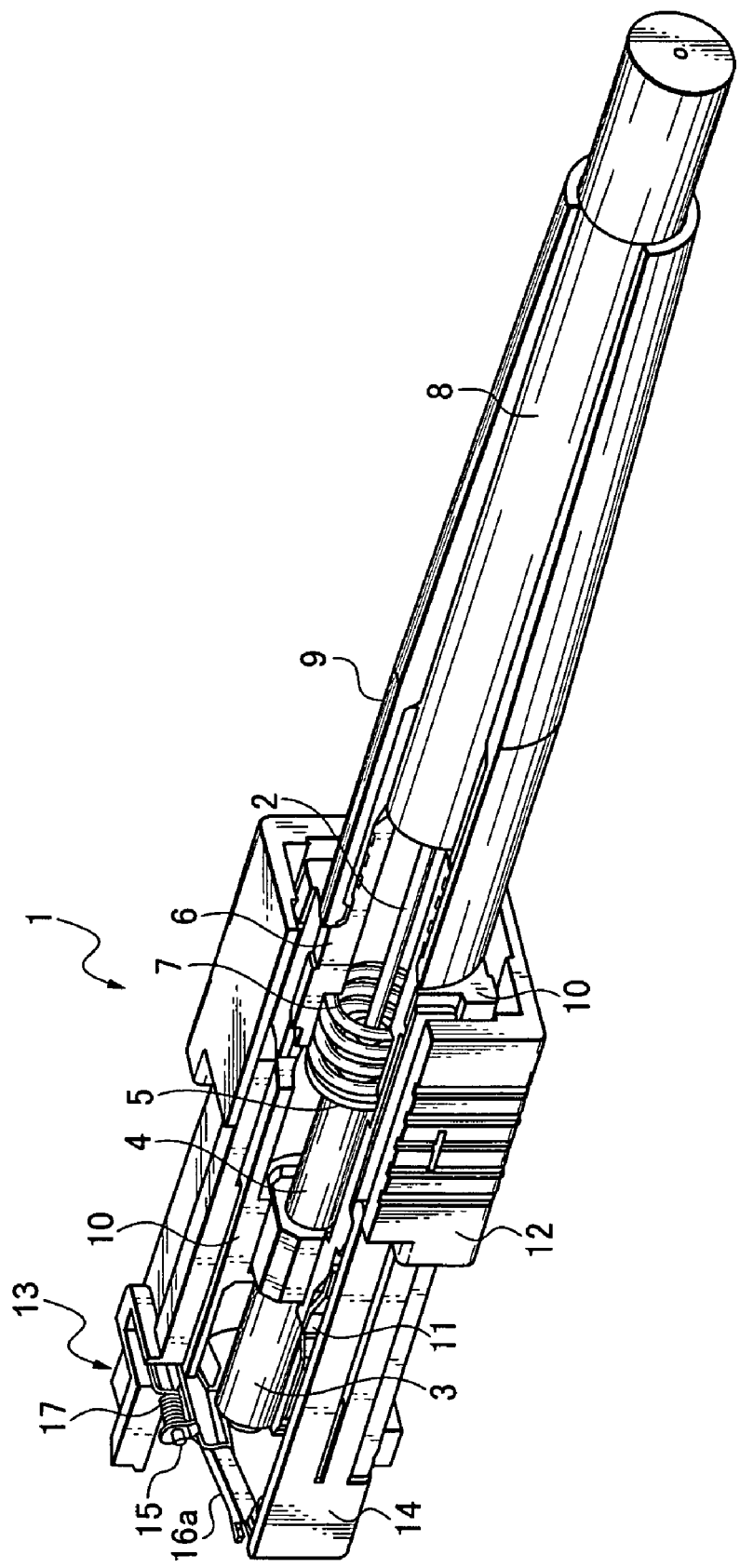
FIG. 1B is a perspective view from the rear side of a partial cross-section of the shaded member-equipped optical connector plug.
Figure 2A:
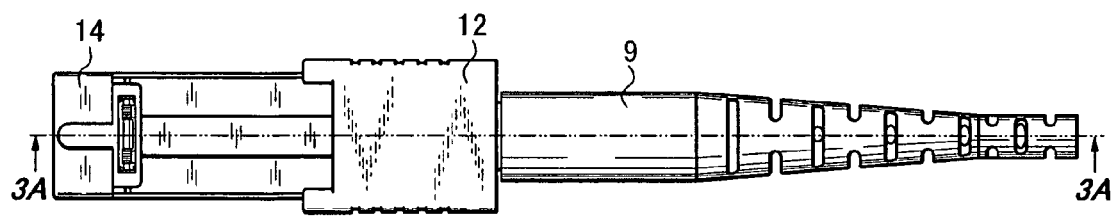
FIGS. 2A, 2B and 2C are top, side and front views, respectively, of the shading member-equipped optical connector plug.
Figure 2B:
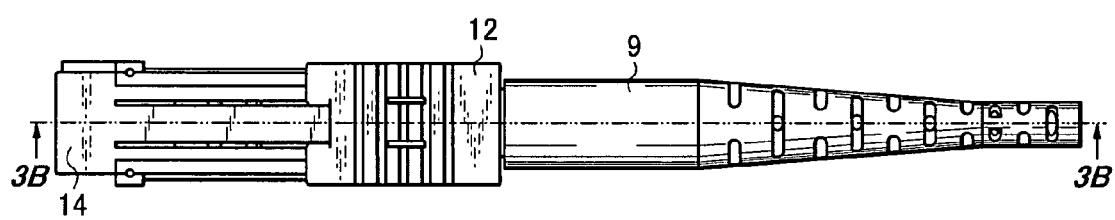
Figure 2C:
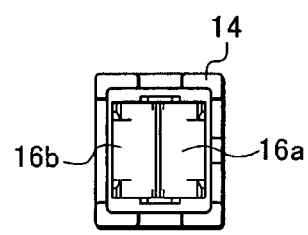
Figure 11A:
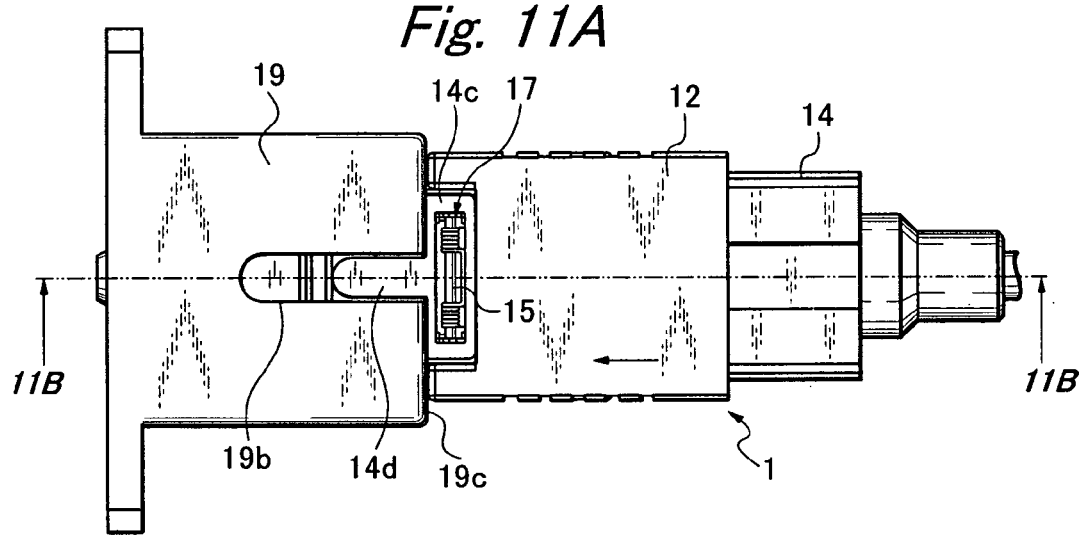
FIGS. 11A and 11B are a top view and a vertical sectional view along a line 11B-11B in FIG. 11A respectively, of the shaded member-equipped optical connector plug and a connector receptacle engaged.
Figure 11B:
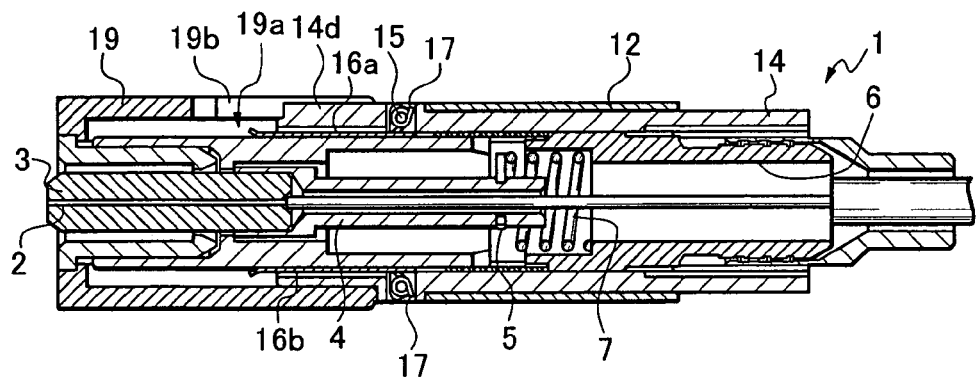

The shutter housing 14, as shown in FIGS. 1A-1B and in FIGS. 8A-8G, is shaped substantially as a rectangular cylinder so as to slide along the outside of and enclose the cylinder-shaped plug frame 10 that contains and supports the ferrule 3 that holds the end of the optical fiber 2 as well as to be inserted into the interior of an engagement opening 19a of a connector receptacle 19 (see FIGS. 11A and 11B) when connecting the optical connector.

Vertically opposed openings 14a are formed in the rectangular cylinder-shaped shutter housing 14, with a guide projection 14d that engages an engagement guide slit 19b in the connector receptacle 19 formed on a top surface side of the shutter housing 14. At the same time, flexible engagement pieces 14e, 14e that engage rear end surfaces 10g of the engagement projections 10c of the plug frame 10 and prevent forward slippage of the shutter housing 14 are provided on both lateral wall surfaces of the shutter housing 14, in the rear ends of which inwardly projecting engagement hooks 14f are formed. By releasing the engagement of these flexible engagement pieces 14e, 14e, the shutter housing 14 can be removed from the plug frame 10, making the shutter housing 14 attachable to and detachable from the plug frame 10.

The shutter 16, as shown in FIGS. 3A and 3B, is comprised of a pair of pieces 16a, 16b mounted in the shape of double doors so as to close the front opening in the shutter housing 14. As shown in FIGS. 9A-9D, the shutter 16 is a plate made of a metal such as stainless steel, with shaft bearing holes 16c formed in both rear corners and a front end 16d bent in the shape of an "R", such that, when the two shutter pieces 16a, 16b close, these front ends 16d contact each other tightly. It should be noted that the shutter may be supported at one end by the shutter housing 14 and formed as a flexible metal sheet that is itself bent so that its other end bends in front of the ferrule 3 and shade the optical fiber 2.

Figure 10A:
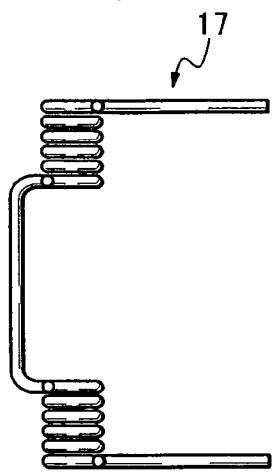
FIGS. 10A and 10B are top and side views, respectively, of a shutter spring of the shaded member-equipped optical connector plug.
Figure 10B:

The shutter spring 17, as shown in FIGS. 10A and 10B, in the present embodiment is formed as a torsion spring, and mounted on the support shaft 15 in the openings 14a in the shutter housing 14 (see FIGS. 1A and 1B), so as to urge the fronts of the shutter pieces 16a, 16b to close in substantially a triangle shape in front of the ferrule 3.

The spring 18 is a coil spring, which is contained in each of the concave portions 10e that are formed in the four corners of the square-shaped plug frame 10 as shown in FIG. 4 as well as along an inner circumferential wall of the shutter housing 14 so as to urge the shutter housing 14 forward at all times. Specifically, the rear end of each spring 18 is supported by one of the spring seats 10f at the rear of the plug frame 10 and the front end of each spring 18 contacts another spring seat 14g provided at the four inside corners of the shutter housing 14.

Engagement of the shading member-equipped optical connector plug 1 configured as described above with the connector receptacle 19 is shown in FIG. 11A through FIG. 12B. When the front end of the shutter housing 14 of the shading member-equipped optical connector plug 1 is inserted in the opening 19a in the connector receptacle 19, the guide projection 14d is engagingly inserted in the engagement guide slit 19b in the connector receptacle 19, and the front end surface of the projection 14c contacts the opening end surface 19c and pushes the shutter housing 14 backward against the biasing force of the springs 18.

Then, the flexible engagement hooks 19d, 19d of the connector receptacle 19 slide on the tapered portions 10i of the plug frame 10 to ride on the flat portions of the pair of walls 10h, 10h and further move to fall at the vertical portion 10j to be engaged therewith and at the same time to be received in the recess 11e of the slider 11 adjoining the rear end of the releasing jig 11d. By moving the shutter housing 14 backward, the shutter pieces 16a, 16b contact the cylindrical body of the plug frame 10, rotate against the biasing force of the shutter spring 17 about the shaft 15, and contact the outer peripheral wall surface of the plug frame 10 and retreat enabling light connection of the ferrule 3. In addition, the projection 14c of the shutter housing 14 is engagingly contained within the concave portion 12b formed in the front end of knob 12.

Thus, as described above, the shading member-equipped optical connector plug 1 engages the connector receptacle 19. It should be noted that the connector receptacle 19 is pre-existing, and just because there is the shading member 13 in the shading member-equipped optical connector plug 1 does not therefore mean that a special connector receptacle 19 is thus required.

Figure 14A:
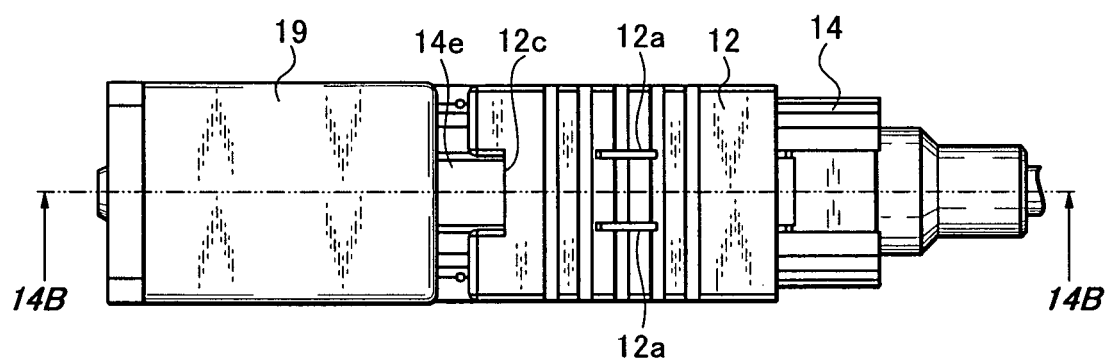
FIGS. 14A and 14B are a side view and a vertical sectional view along a line 14B-14B in FIG. 14A, respectively, showing motions of the respective parts when the shaded member-equipped optical connector plug and connector receptacle are just detached.
Figure 14B:
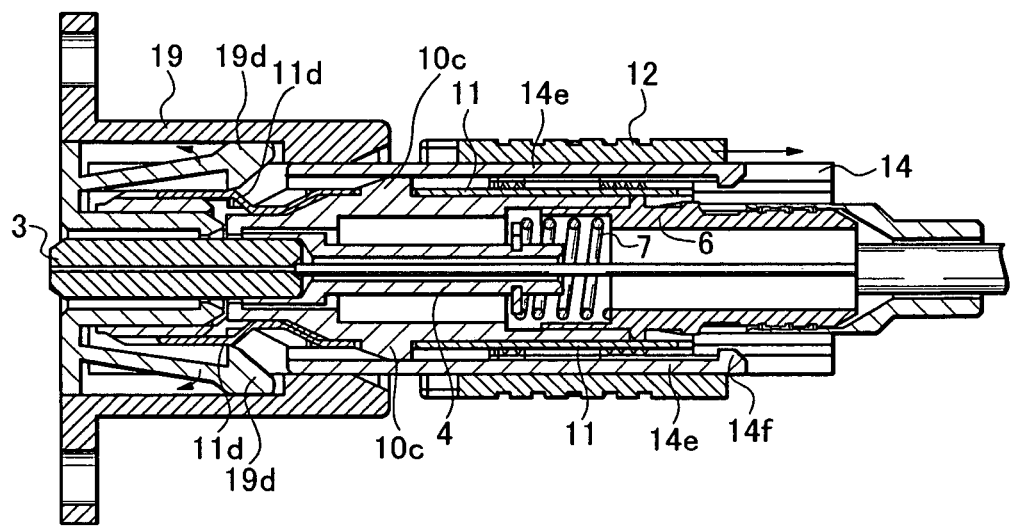

Next in order to detach the shading member-equipped optical connector plug 1 from the connector receptacle 19, as shown in FIG. 13A through FIG. 14B, first, the knob 12 of the optical connector plug 1 is pulled back. When that is done, the knob 12 and the slider 11 engaged together with it are pulled back, which moves the release jig 11d of the slider 11 backward. As shown in FIG. 14B, the slant portion of the release jig 11d pushes the flexible engagement hook 19d of the connector receptacle 19 outwardly to become widened. As the result, the catch portion of the flexible engagement hook 19d comes onto the flat portion of the release jig 11d, enabling backward movement, thus releasing the engagement by pulling the shading member-equipped optical connector plug 1.

Figure 15A:
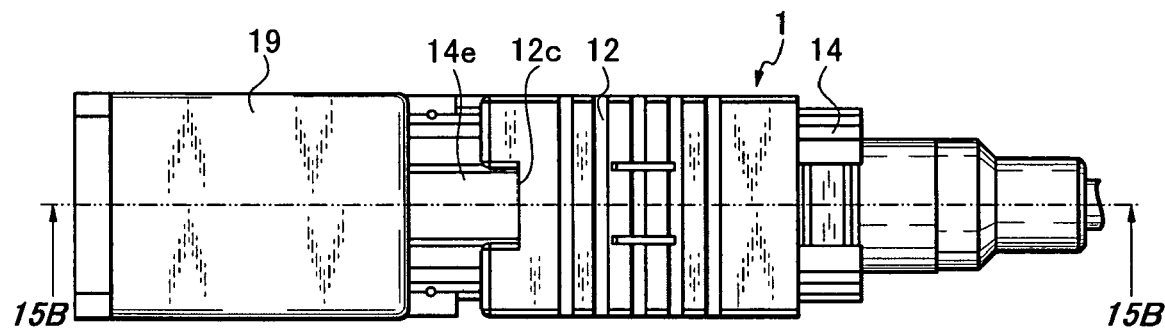
FIGS. 15A and 15B are a side view and a vertical sectional view along a line 15B-15B in FIG. 15A, respectively, of the shaded member-equipped optical connector plug and connector receptacle completely separated.
Figure 15B:
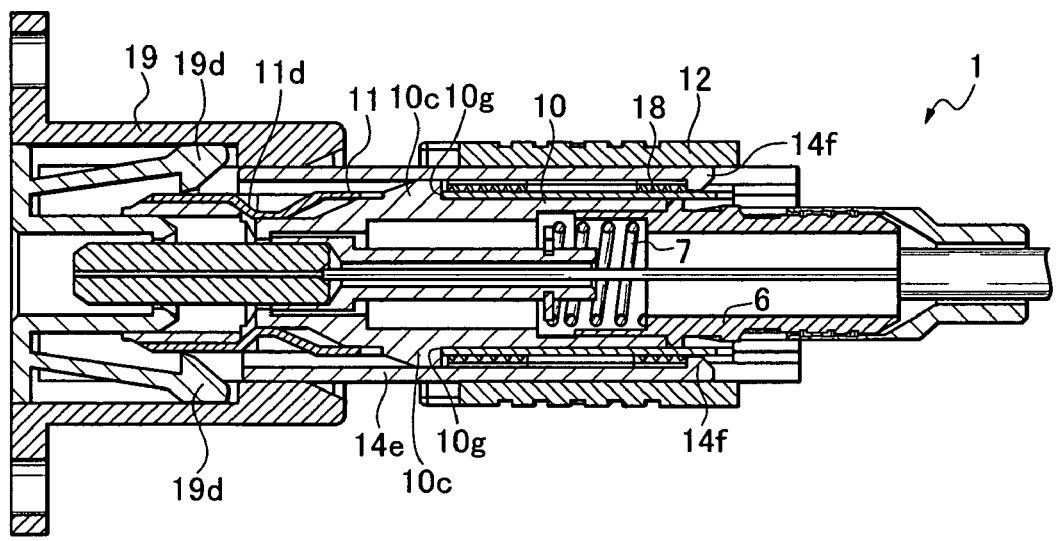

Thereafter, as shown in FIGS. 15A and 15B, when the shading member-equipped optical connector plug 1 is pulled backward from the connector receptacle 19, the front end of the shading member-equipped optical connector plug 1 detaches from the opening 19a in the connector receptacle 19. This detachment results in the shutter housing 14 being urged forward by the springs 18 and the shutter housing 14 moves forward, causing the engagement hooks 14f, 14f of the flexible engagement pieces 14e, 14e to catch on the rear end surfaces 10g of the engagement portions 10c of the plug frame 10. In addition, this movement forward of the shutter housing 14 causes the fronts of the shutter pieces 16a, 16b to project forward from the cylindrical body of the plug frame 10, rotate about the shaft 15 by the biasing force of the shutter spring 17, and close completely as shown in FIGS. 3A and 3B.

It should be noted that, in the shutter 16, the two shutter pieces 16a, 16b are disposed in the shutter housing 14 opposite each other like double doors, such that the front ends of the shutter pieces 16a, 16b that close together may be configured so as to project outside the edge surfaces of the front opening 14h in the shutter housing 14. For example, the front ends of the closing portion 16d of the shutter 16 may be set to project approximately 0.2 mm beyond the end surfaces of the opening in the shutter housing 14. Such a configuration means that, even when an object strikes the front end of the plug it strikes the plug engagement portion first, and thus the shutter housing 14 experiences no relative movement. Therefore, there is no looking directly into the light, and further, there is no scratching of the plug connection end surfaces.

As many seemingly widely different embodiments and variations of the present invention are possible without departing from the spirit and scope thereof, it is to be understood that the present invention is not limited to the specific embodiments thereof and described herein except as defined in the appended claims.

What is claimed is:

1. A shading member-equipped optical connector plug comprising:
   an optical connector plug including
      a synthetic resin plug frame that containably supports a cylindrical stick-shaped ferrule that holds a front end of an optical fiber and a cylindrical ferrule holder assembly that supports said ferrule,
      a cylindrical synthetic resin stop ring attached to a rear end of said plug frame and to which a front end of a synthetic resin hood that protects an optical cable covering the optical fiber is fitted,
      a spring that urges the ferrule forward,
      a planar metal slider engagingly attached to a side wall of the plug frame, and
      a synthetic resin knob engagingly supported by a pair of engagement projections formed on the slider; and
   a shading member that blocks light from the optical fiber on a connection side of the optical connector plug,
   wherein the shading member comprises
      a shutter housing enclosing the plug frame slidably on an outside thereof, and inserted into an engagement opening of a connector receptacle to be engaged when the optical connector is connected,
      a shutter one end of which is supported by said shutter housing at a front part of the housing and another end of which is urged by an elastic force and closes so as to shade the optical fiber at a position in front of the ferrule, and
      an elastic member disposed between the plug frame and the shutter housing that urges the shutter housing forward;
   wherein a pair of flexible engagement pieces is provided on a rear end of the shutter housing, engagement projections that engage said flexible engagement pieces are provided on an outer periphery of said plug frame, and said knob encloses the rear end of said shutter housing and has notches formed in an outer periphery thereof that releases engagement of said flexible engagement pieces outside so as to make the shading member attachable to and detachable from the plug frame.

2. The shading member-equipped optical connector plug according to claim 1, wherein the shutter comprises a pair of opposed shutter pieces disposed within said shutter housing so as to be rotatable about a support shaft, the shutter being disposed so as to be urged by said elastic member and close at a position in front of said ferrule, a closing part where front ends of the shutter pieces contact each other being disposed so as to project outside front side opening edges of the shutter housing.

* * * * *